United States Patent [19]

Sohma

[11] 4,389,754

[45] Jun. 28, 1983

[54] BINDING DEVICE

[75] Inventor: Yoshio Sohma, Tokyo, Japan

[73] Assignee: Nikko Kogyo Kabushiki Kaisha, Tokyo, Japan

[21] Appl. No.: 235,162

[22] Filed: Feb. 13, 1981

[51] Int. Cl.³ ............................................. B65D 63/10
[52] U.S. Cl. ................................ 24/16 PB; 24/17 AP; 248/74 PB
[58] Field of Search .................... 248/74.3, 74.5; 402/61-63; 24/16 PB, 30 SP, 17 AP

[56] References Cited

U.S. PATENT DOCUMENTS

| 2,915,268 | 12/1959 | Wrobel | 24/16 PB |
| 3,049,771 | 8/1962 | Lidwin et al. | 24/16 PB |
| 3,054,585 | 9/1962 | Roberts et al. | 24/16 PB |
| 3,471,109 | 10/1969 | Meyer | 248/74.5 |
| 3,516,631 | 6/1970 | Santucci | 24/16 PB |
| 3,568,262 | 3/1971 | Woldman | 248/74.5 |
| 3,672,615 | 6/1972 | Fiorentino | 24/16 PB |
| 3,842,688 | 10/1974 | Baginski | 24/16 PB |
| 4,003,106 | 1/1977 | Schumacher et al. | 24/16 PB |
| 4,235,404 | 11/1980 | Kraus | 24/16 PB |

FOREIGN PATENT DOCUMENTS

| 899963 | 11/1953 | Fed. Rep. of Germany | 248/74.5 |
| 1573303 | 7/1969 | France | 24/16 PB |

Primary Examiner—Paul J. Hirsch
Attorney, Agent, or Firm—Martin Smolowitz

[57] ABSTRACT

A binding device of the invention comprises a base plate and a flexible ladder-like belt. The ladder-like belt has a plurality of parallel rungs between a pair of side rails and is pivotally mounted on one end of the plate. The other end of the plate is provided with a stopper for engaging one of the rungs to bind a bundle of cable or the like.

12 Claims, 2 Drawing Figures

BINDING DEVICE

BACKGROUND OF THE INVENTION

This invention relates to a binding device that is attachable to a panel or the like and which is capable of arranging one or more electric wires, pipes, etc. together on the panel. More particularly, the invention relates to a binding device that can be used more than once to bind electric wires or the like and which is capable of fixing a bundle of electric wires or the like having various outer configurations and sizes.

Many flexible belts only intended for binding purposes have heretofore been manufactured. Being in the form of a cord, these belts can only bind electric wires and the like and are not suitable for arranging them on a panel. To arrange electric wires on the panel with these belts, two holes are made in the panel and both ends of the belt are passed through the respective holes and fixed on the back side of the panel. This method that makes holes in the panel cannot be used when electric wires or the like are to be arranged on a wall in which holes cannot be made. If the panel is made of metal, the binding belt may break due to friction against the hole.

Binding devices having means for attachment to the panel are known. The simplest form of these devices is a belt rolled up with both edges fixed to the panel by means of nails or screws. The loop of the belt has a shape and size that fit those of individual electric wires to to be bound. Therefore, the user must use several binding devices that have the shape and size adapated for electric wires having greatly varying outer peripheral dimensions. This increases the complexity of the binding job and hence reduces the job efficiency. In addition, increased labor is required to maintain and procure various types of binding devices.

SUMMARY OF THE INVENTION

This invention provides a binding device that eliminates the defects of the prior art products and which has been accomplished on the basis of a new approach. The device comprises a base plate attachable to a panel or the like and a belt hinged on one end of the base plate that engages a stopper on the other end of the base plate. The belt is in the form of a ladder and one of the rungs formed between a pair of side rails come into selective engagement with the stopper.

Therefore, one object of this invention is to provide a binding device that can be used more than once to bind electric wires or pipes in a bundle having various outer peripheral dimensions.

Another object of this invention in to provide a binding device that can securely arrange a bundle of electric wires or pipes on a panel or wall.

A further object of this invention is to provide a binding device that can be used, more than once, in binding electric wires or pipes on a panel or wall which has such device attached thereon.

Still another object of this invention is to provide a binding device that has a great width to bind electric wires or pipes.

These and other objects of this invention will be apparent from the following description of the preferred embodiment by reference to the accompanying drawings.

DESCRIPTION OF THE PREFERRED EMBODIMENT

Figure 1:
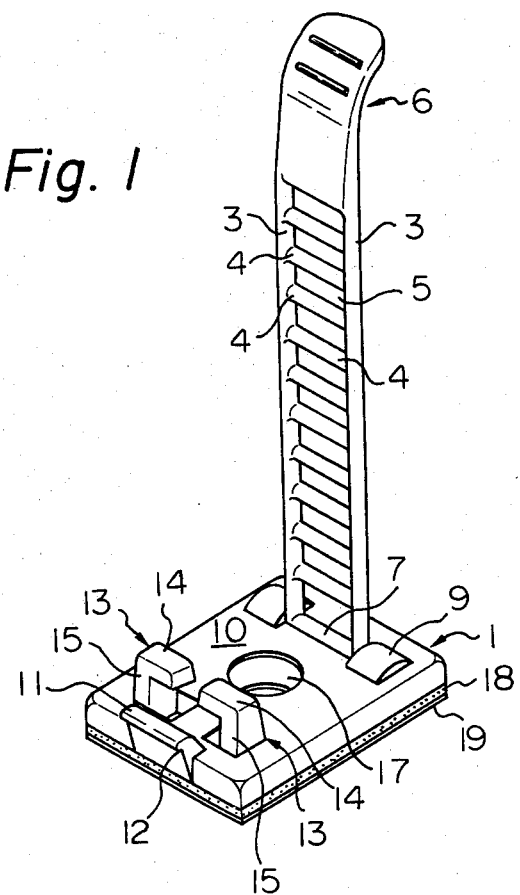
FIG. 1 is a perspective view of a preferred embodiment of the binding device of this invention.

The binding device of this invention comprises a base plate 1 and a flexible, ladder like belt 2 hinged on one end of the base plate. These materials may be made of various materials, but the base plate is made of rigid plastics whereas the belt is made of flexible plastics such as nylon or polypropylene. The belt 2 is composed of a pair of side rails 3, 3 between which a plurality of rungs 4 are formed perpendicularly to the side rails, forming a space 5 between adjacent rungs. The tip of the belt forms a tongue 6 which is slightly curved in one direction or outwardly. The base of the belt forms a rod 7 parallel to the rungs and both of its ends extend from the side rails. The base rod 7 is pivotally mounted in a slot 8 made in the base plate 1 close to one of its ends. The part of the base rod extending from the side rails is received in rod bearing cover 9 which is fixed on the base plate 1.

An inclined stopper 11 is formed on the other end of the plate and it protrudes outwardly from the surface of the plate 1. The length of the stopper 11 is equal to or slightly shorter than the distance between the inner sides of the side rails, and its width is equal to or slightly shorter than the distance between rungs, i.e. the width of the space 5. The tip of the stopper 11 forms a small hook that bends outwardly in such a way that it is capable of engaging one of the rungs.

Figure 2:
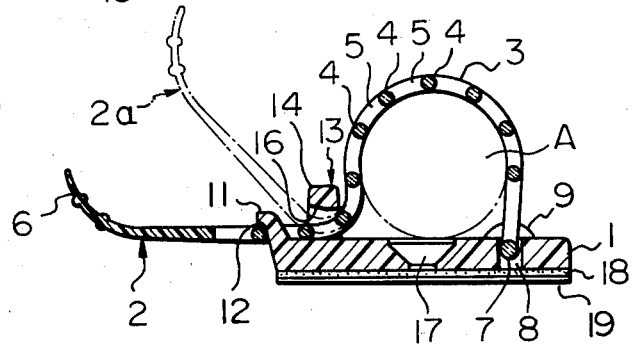
FIG. 2 is a longitudinal cross section of the binding device of FIG. 1 in service.

A pair of guide blocks 13, 13 each in the form of an angle are formed on the surface 10 of the plate close to the stopper 11. The guide blocks consist of horizontal legs 14, 14 that face each other with a gap therebetween and vertical legs 15, 15 the inner sides of which are spaced apart by a distance slightly larger than the distance between the outer sides of the rails. The pair of angles may be replaced by a guide block in the form of a channel. The distance between the inner sides of two legs standing on the base plate to form a channel is equal to the distance between the inner sides of the vertical legs of the guide blocks in the form of an angle. The guide blocks are positioned in such a place that a selected space 5 in the belt 1 that is pulled from between the legs 15, 15 can easily engage the stopper 11. The closer to the stopper the guide blocks are, the greater the binding capacity. Therefore, it is desirable that the inner surface or the underside 16 of each horizontal leg 14 be inclined to depart or diverge from the stopper 11. By virtue of this arrangement, the belt slipped between the guide blocks bends up along the inclined surface 16 as it comes out of the guide blocks, and after assuming the position indicated by the phantom line 2a in FIG. 2, the belt reaches a position where one of the rungs 4 easily comes into engagement with the stopper.

A hole 17 through which a pin is inserted to fix the base plate 1 to a panel or the like is made in a position virtually the center of the plate. For attaching the plate directly onto a panel or the like, a film of an adhesive 18 is formed on the back surface of the plate and the film is covered with a release paper 19.

The binding device of this invention is used by the following procedure: remove the release paper 19 and fix the base plate 1 to a panel or wall with the adhesive 18 or with a screw pin inserted through the hole 17. Then, put a bundle of electric wires or pipes A on the surface 10 of the plate 1, and insert the belt 2 between the guide blocks 13, 13 as it crosses over the wires or pipes A. The belt 2 then assumes the position indicated by the phantom line 2a in FIG. 2 as it stays clear of the stopper 11, yet securely holds the wires or pipes A in place. Pull the tongue 6 downwardly with a jerk until one of the rungs 4 engage the tip 12 of the stopper 11. To remove the wires or pipes A or to change the number of wires or pipes to be bound, pull the tongue 6 again with a jerk until the rung 4 is disengaged from the stopper 11 and the belt returns to an upright position. By following these simple procedures, the device of this invention can be used as many times as desired for binding or rebinding purposes. If the belt need no longer be loosened after it has held the wires or pipes A in place, the part of the belt which extends from the stopper may be cut off. This way, one of the rungs selectively engages the stopper and only one binding device is sufficient to bind various types of electric wires or pipes that form bundles having different outer peripheral shapes and sizes. As another advantage, the wires or pipes are held by the relatively large width of the ladder of the belt, so that there is no possibility that their surface is damaged locally.

What is claimed is:

1. A binding device comprising: a rigid base plate, a flexible ladder-like belt having a plurality of parallel spaced apart rungs provided between a pair of side rails thereof, said belt being hinged on an upper surface of said base plate near one end thereof, an outwardly inclined stopper formed at the opposite end of said base plate to protrude from the upper surface of said plate and away from said belt hinged point for selectively engaging one of said rungs, and a guide means provided on the upper surface of said plate between said hinged point and said stopper, being close to the stopper for use in guiding said belt toward the stopper permitting retention of the belt in binding position on the stopper.

2. A binding device as claimed in claim 1, wherein the free tip end of said belt forms an outwardly curved tongue.

3. A binding device as claimed in claim 1, wherein said belt is made of flexible nylon.

4. A binding device as claimed in claim 1, wherein said belt is made of flexible polypropylene.

5. A binding device as claimed in claim 1, wherein the length of said stopper is not greater than the distance between the inner sides of said side rails and the width of said stopper is not greater than the distance between adjacent rungs.

6. A binding device as claimed in claim 1, wherein said guide means comprises a pair of angle-shaped guide blocks, said blocks having horizontal legs that face one another *and* having a gap therebetween.

7. A binding device as claimed in claim 6, wherein said horizontal legs each have undersurfaces diverging upwardly from the stopper.

8. A binding device as claimed in claim 1, wherein said guide means comprises a guide block in the form of a channel through which said belt is inserted, said channel having an undersurface which diverges upwardly from said stopper.

9. A binding device as claimed in claim 1, wherein said base plate has a centrally located hole through which a pin is inserted to fix the device to a substrate.

10. A binding device as claimed in claim 1, wherein said base plate has an adhesive on the plate back surface for fixing the device to a substrate.

11. A binding device as claimed in claim 1, wherein said belt is hinged on to said base plate by a base rod formed parallel to said rungs, said rod being pivotally mounted in a slot formed on the upper surface of said base plate.

12. A binding device, comprising: a rigid base plate; a flexible ladder-like belt defined by a plurality of parallel spaced apart rungs provided between a pair of side rails thereof, said belt being hinged at its base end on to an upper surface of said base plate at a location close to one end thereof and having an outwardly curved tongue at its working end; an outwardly inclined stopper formed at the opposite end of said base plate, said stopper protruding from the upper surface of said plate and inclined away from said belt hinged location for selectively engaging one of said rungs; and a guide means provided on the upper surface of said base plate between said belt hinged location and said stopper and located in proximity to the stopper, said guide means comprised of a pair of angle-shaped guide blocks having horizontal legs that face one another and being adapted to guide said belt toward the stopper and retaining one of the belt rungs in a binding position on the stopper.

* * * * *